US009608491B2

(12) United States Patent
Kameyama et al.

(10) Patent No.: US 9,608,491 B2
(45) Date of Patent: Mar. 28, 2017

(54) STATOR, MOTOR, BLOWER, AND STATOR MANUFACTURING METHOD

(75) Inventors: Masaki Kameyama, Tokyo (JP); Shinya Oishi, Tokyo (JP); Manabu Deguchi, Tokyo (JP); Toshihiko Mizutani, Tokyo (JP); Takayuki Onihashi, Tokyo (JP); Katsuki Fukuyo, Tokyo (JP); Takashi Suzuki, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 276 days.

(21) Appl. No.: 14/387,771

(22) PCT Filed: Apr. 18, 2012

(86) PCT No.: PCT/JP2012/060500
§ 371 (c)(1),
(2), (4) Date: Sep. 24, 2014

(87) PCT Pub. No.: WO2013/157101
PCT Pub. Date: Oct. 24, 2013

(65) Prior Publication Data
US 2015/0054377 A1 Feb. 26, 2015

(51) Int. Cl.
*H02K 3/34* (2006.01)
*H02K 3/50* (2006.01)
(Continued)

(52) U.S. Cl.
CPC .............. *H02K 3/38* (2013.01); *H02K 1/148* (2013.01); *H02K 3/345* (2013.01); *H02K 3/522* (2013.01);
(Continued)

(58) Field of Classification Search
CPC ..... H02K 3/38; H02K 3/34; H02K 3/345; H02K 1/148
(Continued)

(56) References Cited

U.S. PATENT DOCUMENTS 6,331,760 B1 * 12/2001 McLane, Jr. ........... H02K 17/30
310/179
7,126,246 B2 * 10/2006 Izumi .................... H02K 3/522
310/180
(Continued)

FOREIGN PATENT DOCUMENTS

JP 9-322441 A 12/1997
JP 2002-369470 A 12/2002
(Continued)

OTHER PUBLICATIONS

International Search Report (PCT/ISA/210) mailed on Jul. 24, 2012, by the Japanese Patent Office as the International Searching Authority for International Application No. PCT/JP2012/060500.
(Continued)

*Primary Examiner* — Thomas Truong
(74) *Attorney, Agent, or Firm* — Buchanan Ingersoll & Rooney PC (57) ABSTRACT

A stator includes a first teeth unit including a first insulator having an annular first crossover wire guide and a plurality of first winding units radially provided at regular intervals on an outer circumference of the first crossover wire guide to cover teeth of one phase group of an alternating current, the teeth of the one phase group having upper halves fitted to the first winding units, a third insulator that covers lower halves of the teeth, and a winding wire of one phase wound around the teeth of the one phase group, a second teeth unit having an identical configuration to that of the first teeth unit in which a winding wire of the other phase is wound in a concentrated manner, with second winding units inserted
(Continued)

between adjacent ones of the first winding units, and an annular yoke including a plurality of recesses at regular intervals.

10 Claims, 12 Drawing Sheets

(51) Int. Cl.
*H02K 3/52* (2006.01)
*H02K 1/14* (2006.01)
*H02K 15/095* (2006.01)
*H02K 3/38* (2006.01)
*H02K 15/02* (2006.01)

(52) U.S. Cl.
CPC ......... *H02K 15/022* (2013.01); *H02K 15/095* (2013.01); *H02K 2203/12* (2013.01); *Y10T 29/49009* (2015.01)

(58) Field of Classification Search
USPC .......................................... 310/214, 215, 71
See application file for complete search history.

(56) References Cited

U.S. PATENT DOCUMENTS

| 2006/0103258 | A1 | 5/2006 | Nakano et al. |
| 2009/0324435 | A1* | 12/2009 | Sears ..................... H02K 3/522 417/423.7 |
| 2010/0141059 | A1* | 6/2010 | Nishimura ............... H02K 1/02 310/44 |
| 2012/0098381 | A1* | 4/2012 | Seki ....................... H02K 1/148 310/215 |

FOREIGN PATENT DOCUMENTS

| JP | 2006-148996 A | 6/2006 |
| JP | 2007-236026 A | 9/2007 |

OTHER PUBLICATIONS

Written Opinion (PCT/ISA/237) mailed on Jul. 24, 2012, by the Japanese Patent Office as the International Searching Authority for International Application No. PCT/JP2012/060500.

* cited by examiner

STATOR, MOTOR, BLOWER, AND STATOR MANUFACTURING METHOD

FIELD

The present invention relates to a stator, a motor, a blower, and a stator manufacturing method.

BACKGROUND

A concentrated winding motor has a configuration in which winding wires are wound around one tooth in a concentrated manner, and thus the concentrated winding motor has a high windability and can densely wind the winding wires around the teeth. Accordingly, the concentrated winding motor can achieve downsizing of the motor, increase in the efficiency, and cost reduction. Conventionally, as an example of a single-phase, 8-slot, 4-pole concentrated winding motor, there is a motor disclosed in Patent Literature 1.

CITATION LIST

Patent Literature

Patent Literature 1: Japanese Patent Application Laid-open No. 2002-369470

SUMMARY

Technical Problem

However, in the conventional concentrated winding motor including the motor disclosed in Patent Literature 1, in-phase winding wires are arranged on every other tooth in the case of a single phase and are arranged on every third tooth in the case of three phases, so that the winding wires on adjacent teeth are of different phases. Therefore, a crossover wire connecting the in-phase winding wires needs to cross the adjacent winding wire of a different phase, thereby causing a problem that contact with the winding wire of the different phase is likely to occur.

The present invention has been achieved to solve the above problem, and an object of the present invention is to provide a stator of a motor that can separate crossover wires of respective phases, has a high reliability and a long life, and that is inexpensive.

Solution to Problem

In order to solve the aforementioned problems, a stator according to one aspect of the present invention is configured to include: a first teeth unit including a first insulator having an annular first crossover wire guide and a plurality of first winding units radially provided at regular intervals on an outer circumference of the first crossover wire guide to cover teeth of one phase group of an alternating current, the teeth of the one phase group having upper halves fitted to the first winding units, a third insulator that covers lower halves of the teeth, and a winding wire of one phase wound around the teeth of the one phase group in a concentrated manner via the first winding units and the third insulator while allowing a first crossover wire to pass through the first crossover wire guide; a second teeth unit including a second insulator having an annular second crossover wire guide and a plurality of second winding units radially provided at regular intervals on an outer circumference of the second crossover wire guide to cover teeth of the other phase group of the alternating current, the teeth of the other phase group having upper halves fitted to the second winding units, a third insulator that covers lower halves of the teeth, and a winding wire of other phase wound around the teeth of the other phase group in a concentrated manner via the second winding units and the third insulator while allowing a second crossover wire to pass through the second crossover wire guide, the plurality of second winding units being inserted into between adjacent ones of the first winding units, respectively, and the second crossover wire guide being overlapped on the first crossover wire guide; and an annular yoke including a plurality of recesses at regular intervals on an inner circumference thereof to fit and fix the teeth of the one phase group and the teeth of the other phase group alternately to the recesses.

Advantageous Effects of Invention

The stator of the motor according to the present invention can separate crossover wires of respective phases, has a high reliability and a long life, and that is inexpensive.

BRIEF DESCRIPTION OF DRAWINGS

FIG. 3-1 is a perspective view of a state where an insulator is attached to teeth of a U-phase group.

FIG. 3-2 is a perspective view of a state where an insulator is attached to teeth of a V-phase group.

FIG. 4-1 is a perspective view of a state where a winding wire is provided around the teeth of the U-phase group via the insulator.

FIG. 4-2 is a perspective view of a state where a winding wire is provided around the teeth of the V-phase group via the insulator.

FIG. 10-1 is a front view of a ventilation fan incorporating therein the motor according to the embodiment.

FIG. 10-2 is a side view of the ventilation fan incorporating therein the motor according to the embodiment.

DESCRIPTION OF EMBODIMENTS

Exemplary embodiments of a stator, a motor, a blower, and a stator manufacturing method according to the present invention will be explained below in detail with reference to the accompanying drawings. The present invention is not limited to the embodiments.

Embodiment

Figure 1:
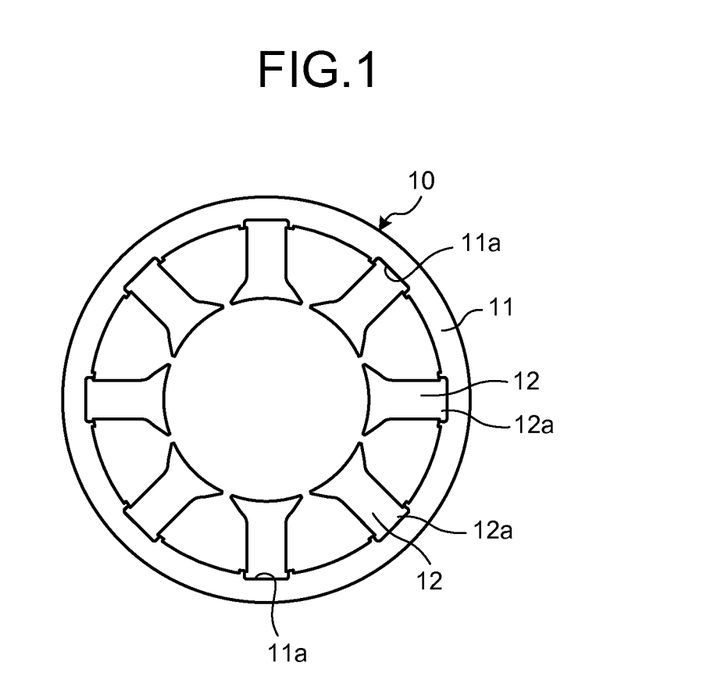
FIG. 1 is a front view of a stator core of a stator according to an embodiment of the present invention.
Figure 2:
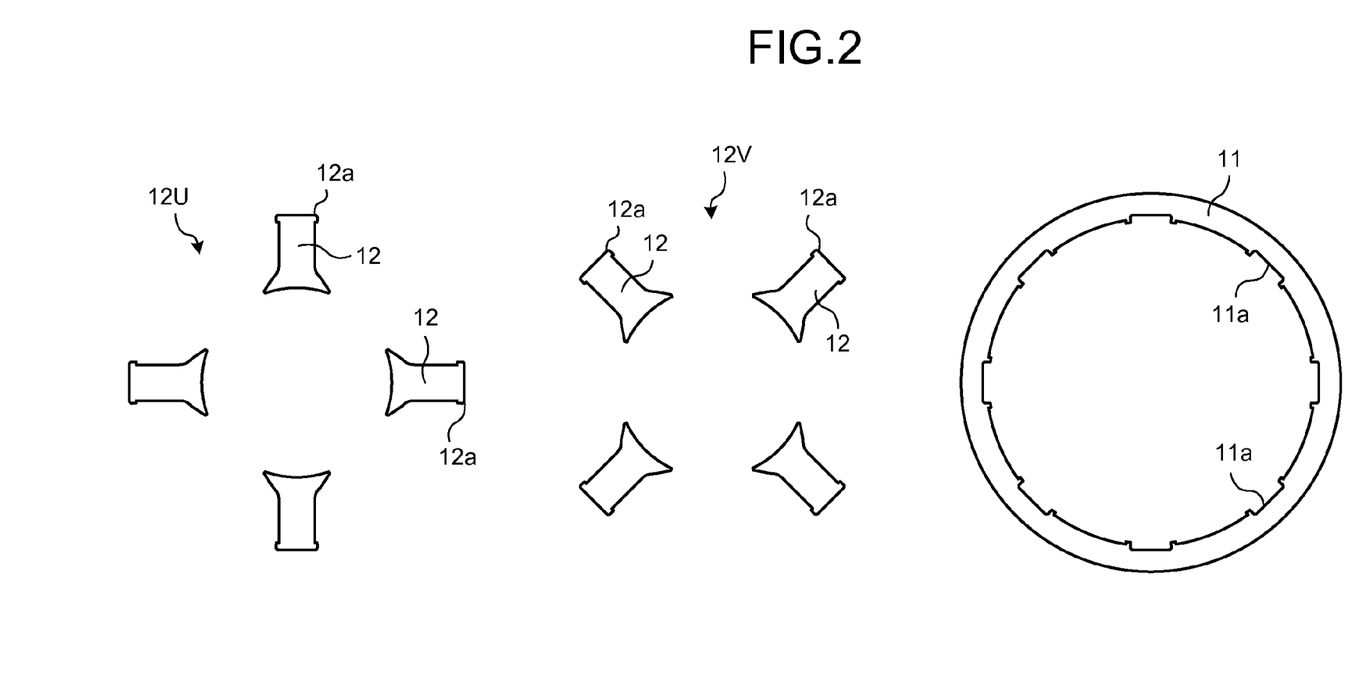
FIG. 2 is a front view of a state where the stator core according to the embodiment is disassembled.
Figure 5:
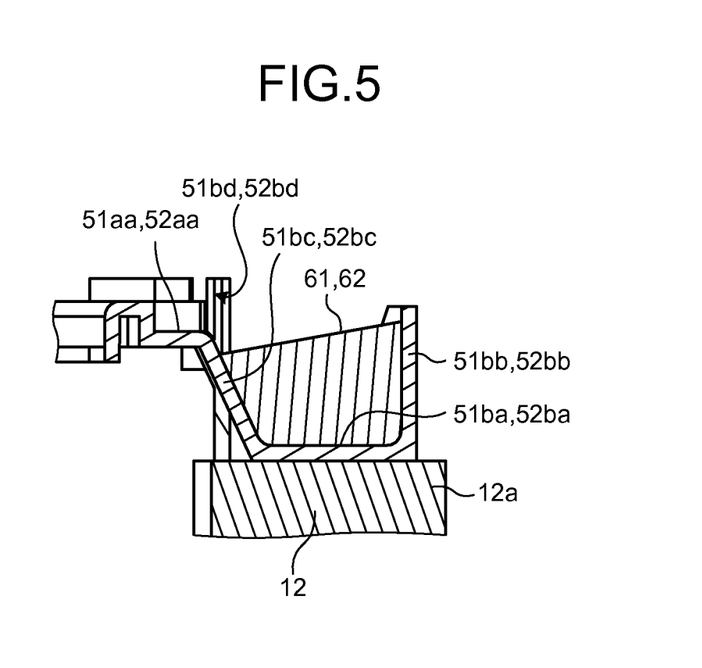
FIG. 5 is a partial sectional view of a winding unit.
Figure 6:
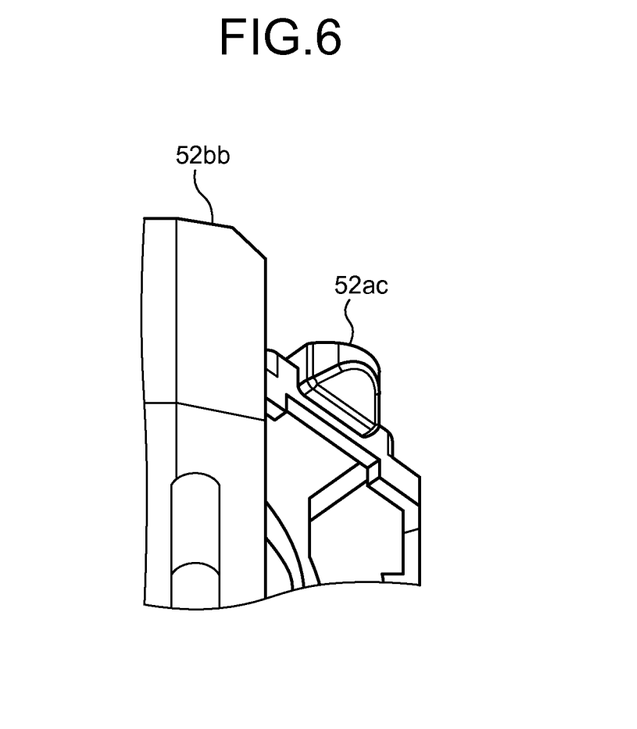
FIG. 6 is a lower perspective view of a claw of a second insulator.
Figure 7:
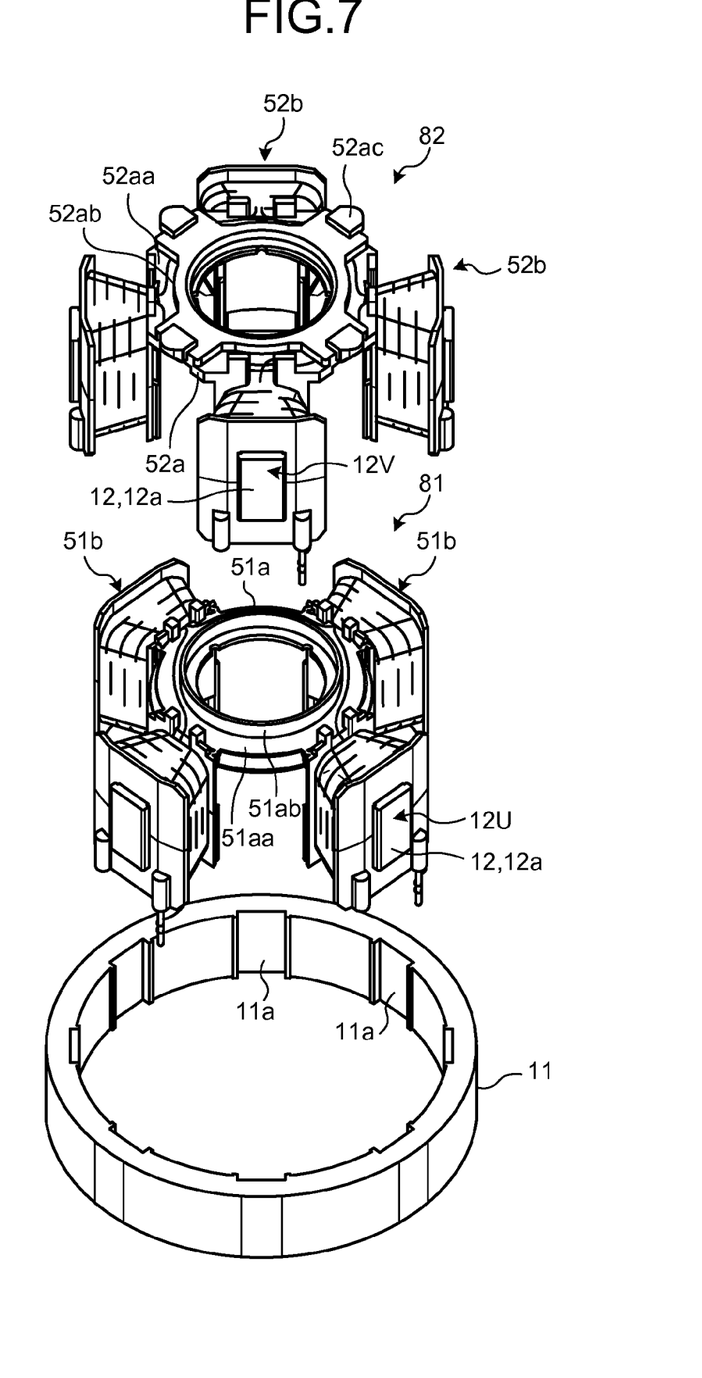
FIG. 7 is an exploded perspective view of the stator according to the embodiment of the present invention.
Figure 8:
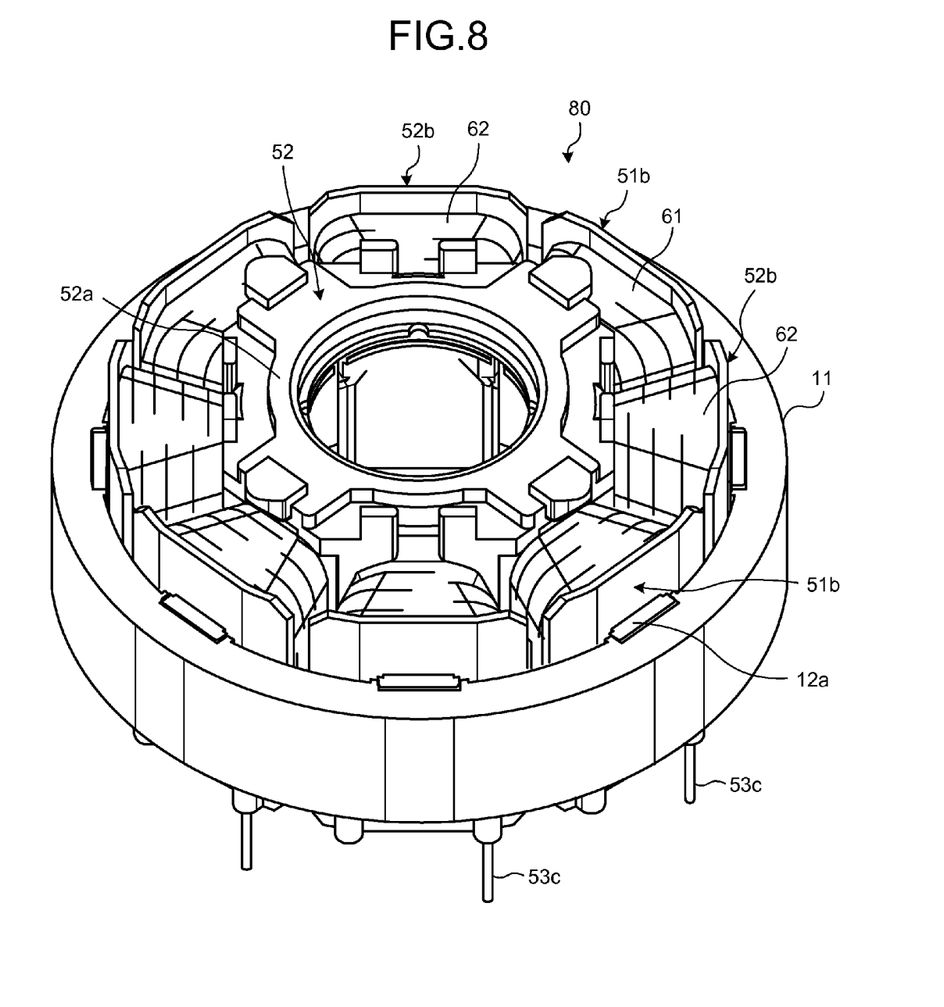
FIG. 8 is a perspective view of the stator according to the embodiment of the present invention.

FIG. 1 is a front view of a stator core of a stator according to an embodiment of the present invention. FIG. 2 is a front view of a state where the stator core according to the embodiment has been disassembled. FIG. 3-1 is a perspective view of a state where an insulator is attached to teeth of a U-phase group. FIG. 3-2 is a perspective view of a state where an insulator is attached to teeth of a V-phase group. FIG. 4-1 is a perspective view of a state where a winding wire is provided around the teeth of the U-phase group via the insulator. FIG. 4-2 is a perspective view of a state where a winding wire is provided around the teeth of the V-phase group via the insulator. FIG. 5 is a partial sectional view of a winding unit. FIG. 6 is a lower perspective view of a claw of a second insulator. FIG. 7 is an exploded perspective view of the stator according to the embodiment of the present invention. FIG. 8 is a perspective view of the stator according to the embodiment of the present invention.

As shown in FIGS. 1 and 2, a stator core 10 according to the present embodiment includes an annular yoke 11, and teeth 12 with base ends 12a thereof fitted and fixed to recesses 11a provided at eight positions on the inner circumference of the yoke 11 at regular intervals, respectively. The stator core 10 according to the present embodiment is a stator core of a single-phase, 8-slot, 4-pole concentrated winding motor.

Before performing winding around the stator core 10, the stator core 10 is disassembled into the yoke 11 and the teeth 12, and the teeth 12 are divided into a U-phase group 12U around which a winding wire of a U phase (one of phases) of a single-phase alternating current is wound in a concentrated manner and a V-phase group 12V around which a winding wire of a V phase (the other phase) is wound in a concentrated manner as shown in FIG. 2.

The U-phase group 12U is a group including one tooth 12 as a basis and three teeth 12 at positions which are different in angle by 90 degrees, respectively, starting from the basis tooth 12. The V-phase group 12V is a group including a tooth 12 adjacent to the basis tooth 12 and three teeth 12 at positions which are different in angle by 90 degrees, respectively, starting from the adjacent tooth 12.

Figure 31:
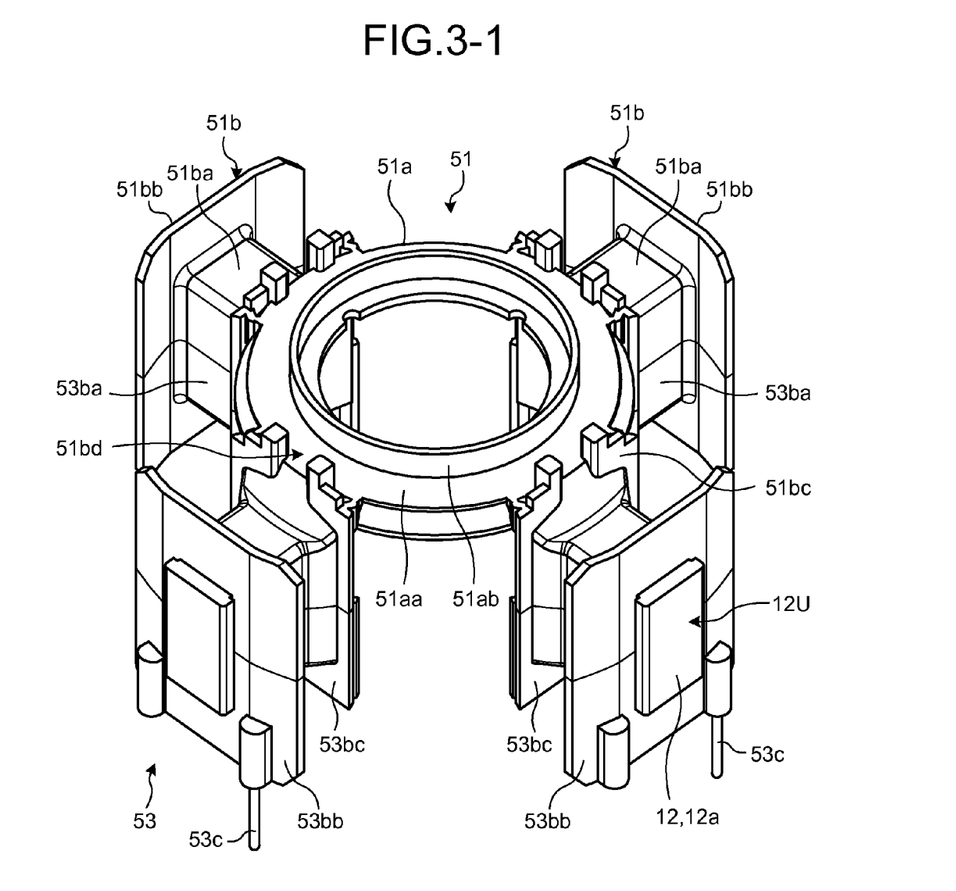
Figure 41:
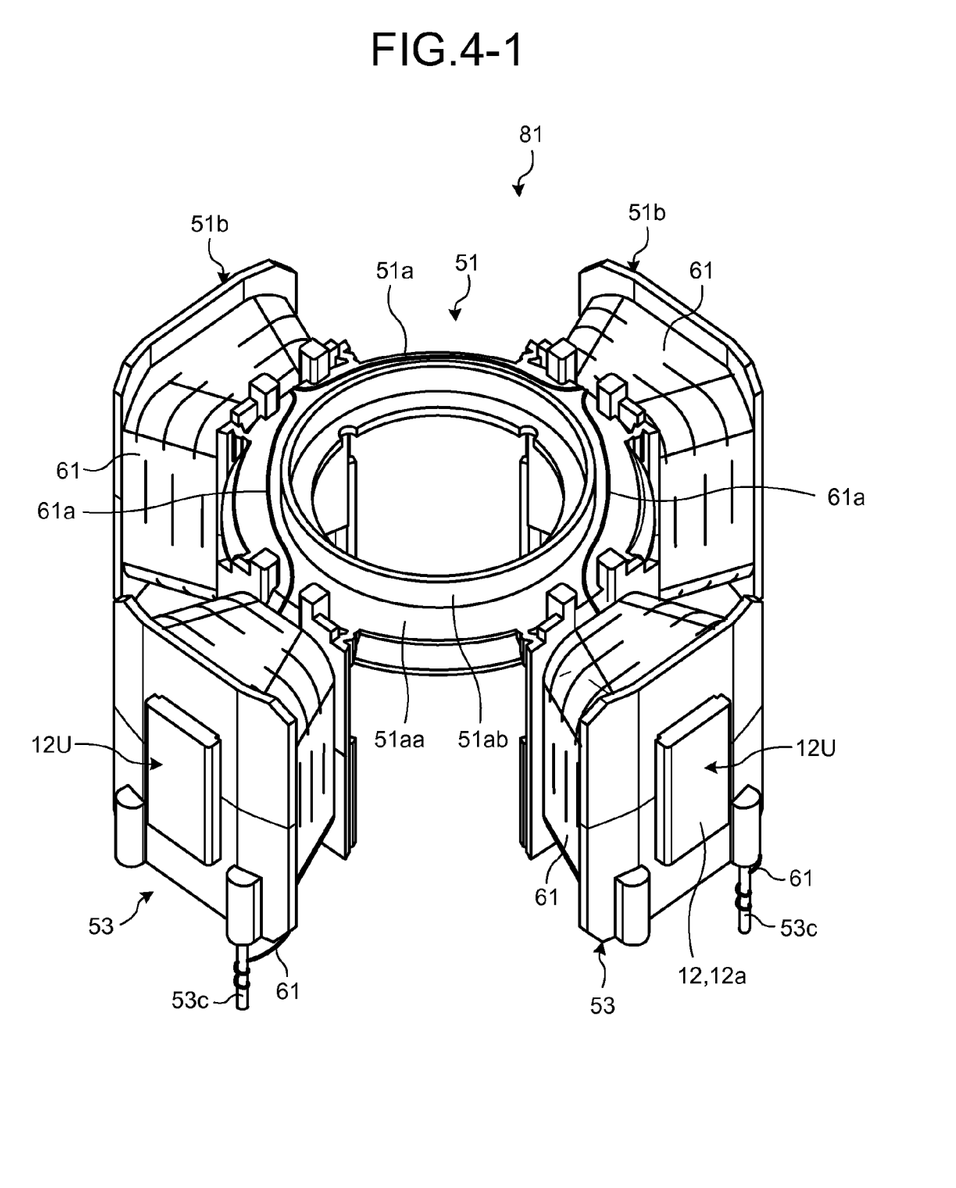

As shown in FIG. 3-1, the four teeth 12 of the U-phase group 12U are integrated by a first insulator 51. The first insulator 51 includes an annular first crossover wire guide 51a, and four (plural) first winding units 51b radially provided on the outer circumference of the first crossover wire guide 51a to be separated from each other by 90 degrees. The first crossover wire guide 51a includes an annular first floor part 51aa, and a first cylindrical part 51ab provided on the inner circumference of the first floor part 51aa. The first floor part 51aa allows a first crossover wire 61a (see FIG. 4-1) to run thereon, and the first cylindrical part 51ab allows the first crossover wire 61a to run therealong, whereby the parts 51aa and 51ab guide the first crossover wire 61a.

Each of the first winding units 51b includes a first barrel part 51ba that covers an upper half of the relevant tooth 12 of the U-phase group 12U, a first outer flange 51bb provided outside of the first barrel part 51ba, and a first inner flange 51bc provided inside of the first barrel part 51ba and connected to the first crossover wire guide 51a. A first gate 51bd that allows the first crossover wire 61a (see FIG. 4-1) to pass therethrough is provided between the first crossover wire guide 51a and the first winding unit 51b at an upper center of the first inner flange 51bc.

Third insulators 53 each include a barrel part 53ba that covers a lower half of one of the teeth 12, an outer flange 53bb provided outside of the barrel part 53ba, and an inner flange 53bc provided inside of the barrel part 53ba. Pins 53c serving as relay points between an external power wire and the winding wire or neutral points of winding ends of the U-phase winding wire and the V-phase winding wire are attached outside of the outer flanges 53bb, respectively.

Figure 32:
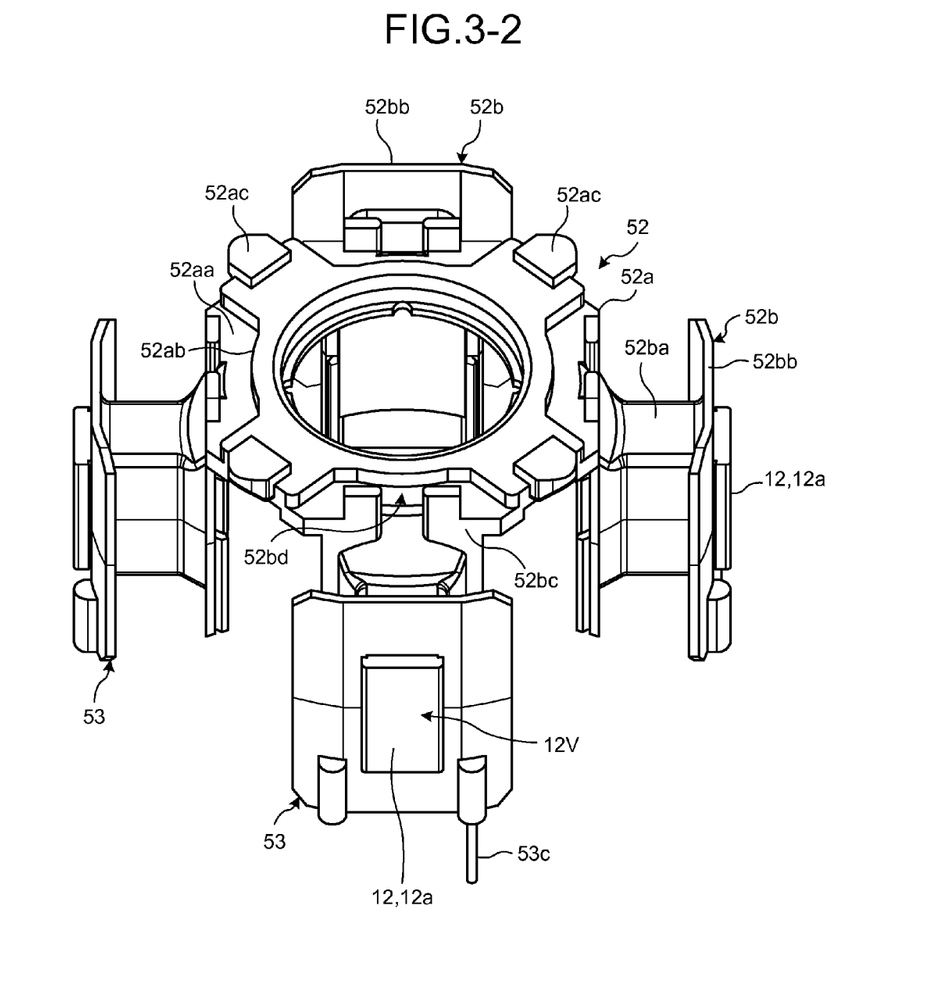

As shown in FIG. 3-2, the four teeth 12 of the V-phase group 12V are integrated by a second insulator 52. The second insulator 52 includes an annular second crossover wire guide 52a, and four (plural) second winding units 52b radially provided on the outer circumference of the second crossover wire guide 52a to be separated from each other by 90 degrees. The second crossover wire guide 52a includes an annular second floor part 52aa, a second cylindrical part 52ab provided on the inner circumference of the second floor part 52aa, and four claws 52ac protruding radially outward from an upper part of the second cylindrical part 52ab.

Figure 42:
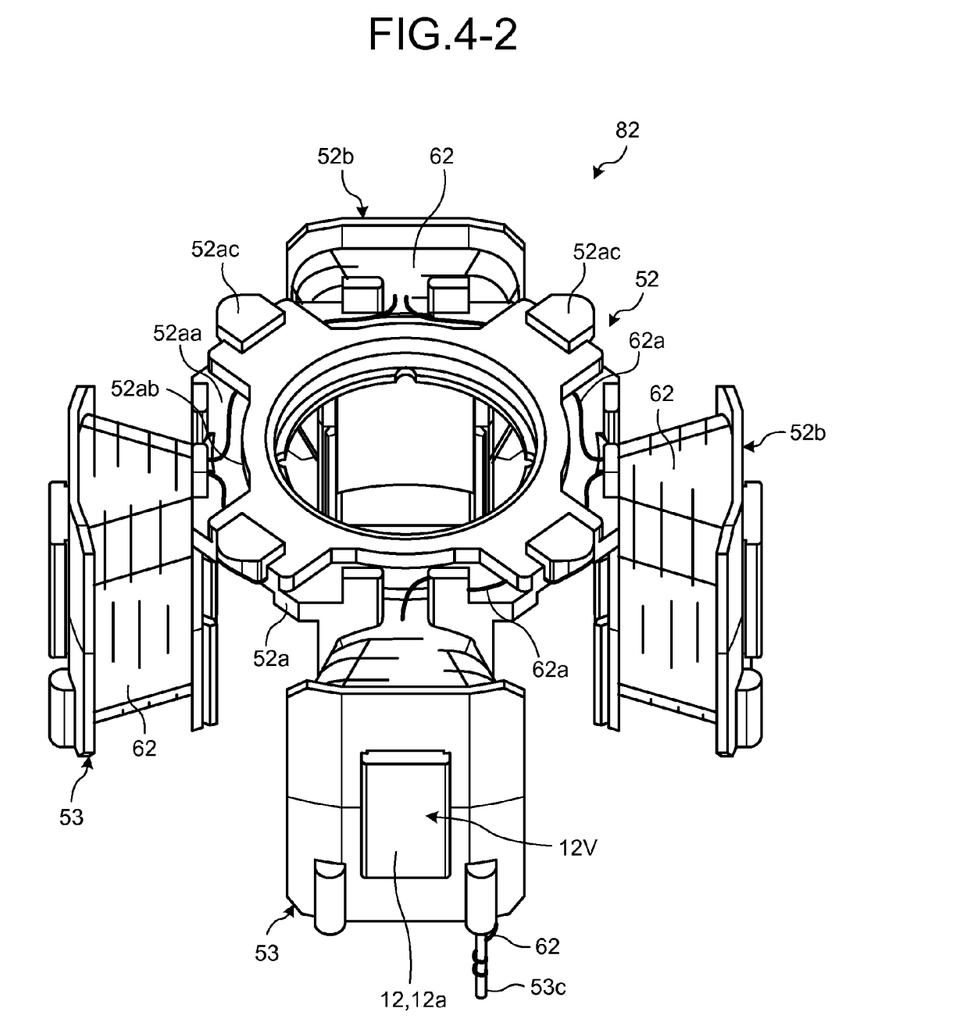

The second floor part 52aa allows a second crossover wire 62a (see FIG. 4-2) to run thereon, and the second cylindrical part 52ab allows the second crossover wire 62a to run therealong, whereby the parts 52aa and 52ab guide the second crossover wire 62a. The claws 52ac hold the second crossover wire 62a to prevent the second crossover wire 62a from coming off the second crossover wire guide 52a. Accordingly, the second crossover wire 62a can be prevented from coming in contact with non-charged metal parts such as a frame and a cover of the motor, thereby enabling to provide a highly reliable motor.

Each of the second winding units 52b includes a second barrel part 52ba that covers an upper half of the relevant tooth 12 of the V-phase group 12V, a second outer flange 52bb provided outside of the second barrel part 52ba, and a second inner flange 52bc provided inside of the second barrel part 52ba and connected to the second crossover wire guide 52a. A second gate 52bd that allows the second crossover wire 62a (see FIG. 4-2) to pass therethrough is provided between the second crossover wire guide 52a and the second winding unit 52b at an upper center of the second inner flange 52bc.

Because the four third insulators 53 that cover lower halves of the teeth 12 of the V-phase group 12V are the same as the four third insulators 53 that cover the lower halves of the teeth 12 of the U-phase group 12U, explanations thereof are omitted.

Winding wires 61 of one phase are wound around the four teeth 12 of the U-phase group 12U in a state where the four teeth 12, the first insulator 51, and the four third insulators 53 are integrated as shown in FIG. 3-1. As shown in FIG. 4-1, a winding start end of a winding wire 61 is first entwined around one of the pins 53c, and then concentrated winding and crossover are repeated in such a manner that the winding wire 61 is wound around one of the teeth 12 in a concentrated manner via the corresponding first winding unit 51b and the corresponding third insulator 53, and the first crossover wire 61a is guided to the adjacent first winding unit 51b through the first gate 51bd and the first crossover wire guide 51a. Accordingly, the winding wires 61 of one phase are wound in series around the four teeth 12 of the U-phase group 12U in the concentrated manner. A winding end of the winding wires 61 is entwined around the other pin 53c as the neutral point. A first teeth unit 81 is completed by the above winding operations.

Winding wires 62 of the other phase are wound around the four teeth 12 of the V-phase group 12V in a state where the four teeth 12, the second insulator 52, and the four third insulators 53 are integrated as shown in FIG. 3-2. As shown in FIG. 4-2, a winding start end of a winding wire 62 is entwined around the pin 53c, and then concentrated winding and crossover are repeated in such a manner that the winding wire 62 is wound around one of the teeth 12 in the concentrated manner via the corresponding second winding unit 52b and the corresponding third insulator 53, and the second crossover wire 62a is guided to the adjacent second winding unit 52b through the second gate 52bd and the second crossover wire guide 52a. Accordingly, the winding wires 62 of the other phase are wound in series around the four teeth 12 of the V-phase group 12V in the concentrated manner. A winding end of the winding wire 62 is entwined around the other pin 53c of the first teeth unit 81 as the neutral point. A second teeth unit 82 is completed by the above winding operations.

Winding operations of the first and second teeth units 81 and 82 are performed from the outer circumference sides of the first and second teeth units 81 and 82 by a winding machine, respectively. After the first and second winding wires 61 and 62 are wound around one tooth 12 in the concentrated manner, the first and second crossover wires 61a and 62a run on the first and second floor parts 51aa and 52aa, to move to the concentrated winding around the corresponding adjacent teeth 12, respectively. At this time, because the first and second barrel parts 51ab and 52ab are provided, the first and second crossover wires 61a and 62a can move to the corresponding adjacent teeth 12 along the first and second barrel parts 51ab and 52ab only by rotating the first and second teeth units 81 and 82 by 90 degrees, respectively. Therefore, the first and second crossover wires 61a and 62a do not protrude into inside of the first and second crossover wire guides 51a and 52a.

At the time of the end of the concentrated winding of the winding wires 61 and 62 around the teeth 12, the winding wires 61 and 62 have the same height as that of the first and second floor parts 51aa and 52aa. However, because the height of the first and second inner flanges 51bc and 52bc on the opposite sides of the first and second gates 51bd and 52bd is set to be higher than the height of the first and second floor parts 51aa and 52aa, the first and second crossover wires 61a and 62a do not come off from the first and second gates 51bd and 52bd, respectively, which facilitates the winding operation.

As shown in FIG. 5, central parts of the first and second inner flanges 51bc and 52bc are made to be inclined surfaces, with the upper parts thereof being inclined inwardly and connected to the first and second floor parts 51aa and 52aa, respectively. Therefore, the first and second crossover wires 61a and 62a can be smoothly guided from the first and second floor parts 51aa and 52aa to the winding start positions of the first and second barrel parts 51ba and 52ba along the inclined surfaces of the first and second inner flanges 51bc and 52bc.

As shown in FIG. 6, a rear side of the claw 52ac is an inclined surface like a triangular pyramid, and even if the position of the second crossover wire 62a is misaligned at the time of the winding operation by the winding machine, the second crossover wire 62a slides on the inclined surface of the claw 52ac and is surely set at a base of the claw 52ac.

As shown in FIG. 7, each of the four second winding units 52b of the second teeth unit 82 is inserted into between adjacent ones of the four first winding units 51b of the first teeth unit 81, and the second crossover wire guide 52a is overlapped on the first crossover wire guide 51a to integrate the first teeth unit 81 and the second teeth unit 82.

The integrated first teeth unit 81 and second teeth unit 82 are inserted into the yoke 11, and the teeth 12 of the U-phase group 12U and the teeth 12 of the V-phase group 12V are fitted and fixed alternately to the recesses 11a in the yoke 11, so that a stator 80 according to the present embodiment shown in FIG. 8 is completed.

An axial position of the second crossover wire guide 52a is higher than an axial position of the first crossover wire guide 51a, and thus the second crossover wire guide 52a can be overlapped on the first crossover wire guide 51a.

Slot widths of the first and second winding units 51b and 52b are wider on the side of the first and second outer flanges 51bb and 52bb than on the side of the first and second inner flanges 51bc and 52bc, respectively. Therefore, when the winding wires 61 and 62 of the first and second winding units 51b and 52b are wound all over the slot widths, the winding wires 61 and 62 on the first and second winding units 51b and 52b have fan shapes, respectively. Accordingly, the winding wires 61 and 62 on the side of the first and second outer flanges 51bb and 52bb are higher than on the side of the first and second inner flanges 51bc and 52bc, respectively. The first and second inner flanges 51bc and 52bc are set to be lower than the first and second outer flanges 51bb and 52bb, respectively, and the first floor part 51aa is also set to be lower than the first and second outer flanges 51bb and 52bb.

Accordingly, when the second teeth unit 82 is overlapped on the first teeth unit 81, the first floor part 51aa falls within the heights of the first and second outer flanges 51bb and 52bb. Therefore, the first floor part 51aa does not project upward from the first and second outer flanges 51bb and 52bb, and thus the size of the stator 80 in the height direction (the axial direction) can be reduced, thereby enabling to downsize the motor.

As explained above, in the stator 80 according to the present embodiment, the first crossover wire 61a of one phase is led to pass through the first crossover wire guide 51a and the second crossover wire 62a of the other phase is led to pass through the second crossover wire guide 52a to separate the first and second crossover wires 61a and 62a of the respective phases. Consequently, the stator has a high reliability against short circuit and a long life and is inexpensive.

Figure 9:
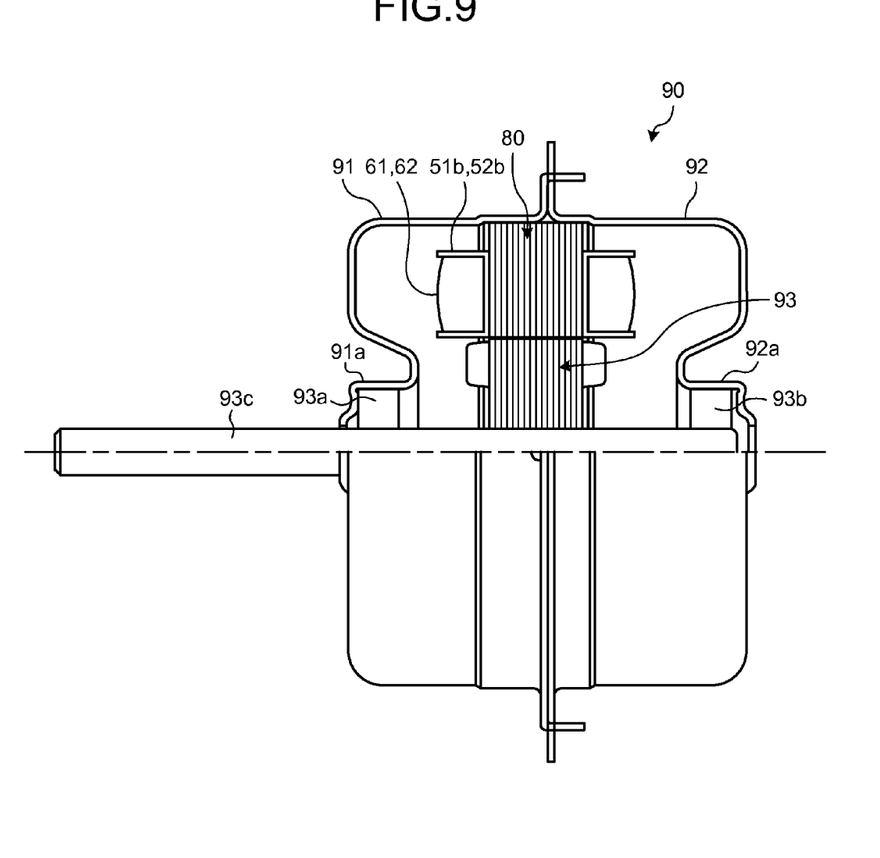
FIG. 9 is a partial sectional view of a motor incorporating therein the stator according to the embodiment.
Figure 101:
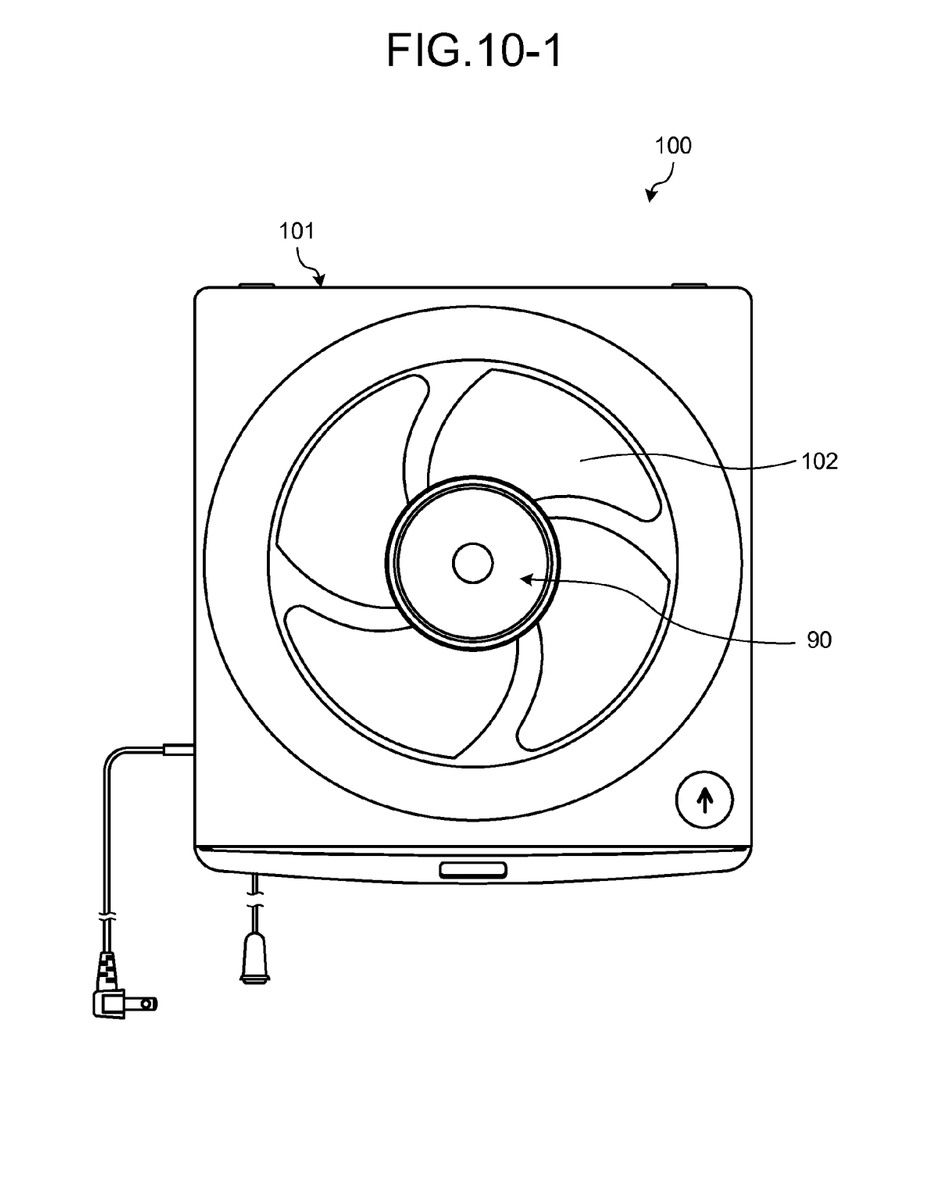
Figure 102:
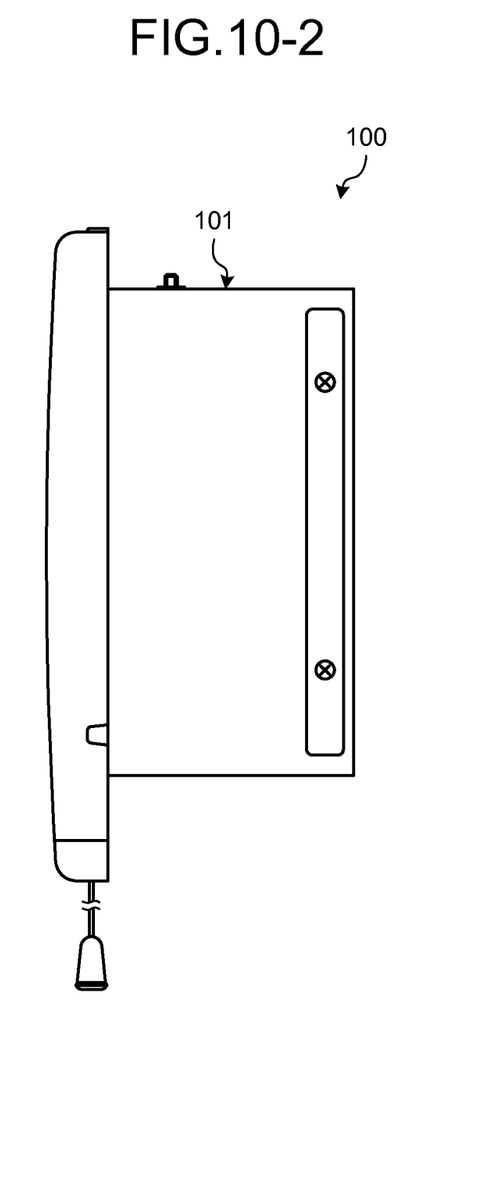

FIG. 9 is a partial sectional view of a motor incorporating therein the stator according to the embodiment. FIG. 10-1 is a front view of a ventilation fan incorporating therein the motor according to the embodiment. FIG. 10-2 is a side view of the ventilation fan incorporating therein the motor according to the embodiment.

As shown in FIG. 9, a motor 90 according to the present embodiment includes a frame 91 in which a front-bearing holding part 91a is formed at the center of a front end plate, the stator 80 according to the present embodiment fitted in a cylindrical barrel part of the frame 91, a cover 92 in which a front-end outer circumference thereof is fitted to the stator 80 and connected to the frame 91 and a rear-bearing holding part 92a is formed at the center of a rear end plate, and a rotor 93 in which a front bearing 93a fitted to a rotation shaft 93c and held by the front-bearing holding part 91a of the frame 91 and a rear bearing 93b fitted to the rotation shaft 93c and held by the rear-bearing holding part 92a are arranged in the stator 80. Because the motor 90 incorporates the stator 80 according to the present embodiment, the motor 90 has a high reliability and a long life and is inexpensive.

As shown in FIGS. 10-1 and 10-2, in a ventilation fan 100 according to the present embodiment as a blower, the motor 90 according to the present embodiment that drives a fan 102 is mounted on a frame 101. Because the ventilation fan 100 as the blower includes the motor 90 according to the present embodiment, the ventilation fan 100 has a high reliability and a long life and is inexpensive. Although not shown, the motor 90 according to the present embodiment can be mounted on an electric fan as the blower.

REFERENCE SIGNS LIST 10 stator core
11 yoke 11a depressed portion
12 tooth
12a base end
12U U-phase group
12V V-phase group
51 first insulator
51a first crossover wire guide
51aa first floor part
51ab first cylindrical part
51b first winding unit
51ba first barrel part
51bb first outer flange
51bc first inner flange
51bd first gate
52 second insulator
52a second crossover wire guide
52aa second floor part
52ab second cylindrical part
52ac claw
52b second winding unit
52ba second barrel part
52bb second outer flange
52bc second inner flange
52bd second gate
53 third insulator
53ba barrel part
53bb outer flange
53bc inner flange
53c pin
61 winding wire
62 winding wire
61a first crossover wire
62a second crossover wire
80 stator
81 first teeth unit
82 second teeth unit
90 motor
91 frame
91a front-bearing holding part
92 cover
92a rear-bearing holding part
93 rotor
93a front bearing
93b rear bearing
93c rotation shaft
100 ventilation fan (blower)
101 frame
102 fan

The invention claimed is:

1. A stator comprising:
a first teeth unit including a first insulator having an annular first crossover wire guide and a plurality of first winding units radially provided at regular intervals on an outer circumference of the first crossover wire guide to cover teeth of one phase group of an alternating current, the teeth of the one phase group having upper halves fitted to the first winding units, a third insulator that covers lower halves of the teeth, and a winding wire of one phase wound around the teeth of the one phase group in a concentrated manner via the first winding units and the third insulator while allowing a first crossover wire to pass through the first crossover wire guide;
a second teeth unit including a second insulator having an annular second crossover wire guide and a plurality of second winding units radially provided at regular intervals on an outer circumference of the second crossover wire guide to cover teeth of the other phase group of the alternating current, the teeth of the other phase group having upper halves fitted to the second winding units, a third insulator that covers lower halves of the teeth, and a winding wire of other phase wound around the teeth of the other phase group in a concentrated manner via the second winding units and the third insulator while allowing a second crossover wire to pass through the second crossover wire guide, the plurality of second winding units being inserted into between adjacent ones of the first winding units, respectively, and the second crossover wire guide being superposed on the first crossover wire guide in an axial direction thereof; and
an annular yoke including a plurality of recesses at regular intervals on an inner circumference thereof to fit and fix the teeth of the one phase group and the teeth of the other phase group alternately to the recesses.

2. The stator according to claim 1, wherein the first crossover wire guide has an annular first floor part on which the first crossover wire runs, through which the winding wire of the one phase wound around one of the first winding units in the concentrated manner moves to adjacent ones of the first winding units, and the second crossover wire guide has an annular second floor part on which the second crossover wire runs, through which the winding wire of the other phase wound around one of the second winding units in the concentrated manner moves to adjacent one of the second winding units.

3. The stator according to claim 2, wherein the first and second crossover wire guides have first and second barrel parts that cause the first and second crossover wires to lie therealong on inner circumferences of the annular first and second floor parts, respectively.

4. The stator according to claim 3, wherein a claw that holds the second crossover wire is provided on the second crossover wire guide.

5. The stator according to claim 2, wherein each of the first winding units has a first inner flange and a first outer flange, each of the second winding units has a second inner flange and a second outer flange, and central parts of the first and second inner flanges have surfaces declining from the first and second floor parts, respectively toward the respective first and second outer flanges.

6. The stator according to claim 5, wherein axial heights of the first and second floor parts are set to be lower than axial heights of the first and second outer flanges of the first and second winding units.

7. The stator according to claim 1, wherein first and second gates that cause the first and second crossover wires to pass therethrough toward the first and second crossover wire guides are provided respectively in centers of the first and second inner flanges of the first and second winding units, respectively.

8. A motor comprising the stator according to claim 1.

9. A blower comprising the motor according to claim 8.

10. A stator manufacturing method comprising:
winding a winding wire around teeth of one phase group of an alternating current of a first teeth unit, which includes a first insulator having an annular first crossover wire guide and a plurality of first winding units radially provided at regular intervals on an outer circumference of the first crossover wire guide to cover the teeth of the one phase group, the teeth of the one phase group having upper halves fitted to the first winding units, and a third insulator that covers lower halves of the teeth, in a concentrated manner via the first winding units and the third insulator while allowing a first crossover wire to pass through the first crossover wire guide;

winding a winding wire around teeth of other phase group of the alternating current of a second teeth unit, which includes a second insulator having an annular second crossover wire guide and a plurality of second winding units radially provided at regular intervals on an outer circumference of the second crossover wire guide to cover the teeth of the other phase group, the teeth of the other phase group having upper halves fitted to the second winding units, a third insulator that covers lower halves of the teeth, in a concentrated manner via the second winding units and the third insulator while allowing a second crossover wire to pass through the second crossover wire guide;

integrating the first teeth unit and the second teeth unit by inserting each of the second winding units of the second teeth unit into between adjacent ones of the first winding units of the first teeth unit such that the second crossover wire guide is superposed on the first crossover wire guide in an axial direction thereof; and alternately fitting and fixing the teeth of the one phase group and the teeth of the other phase group to a plurality of recesses provided on an inner circumference of an annular yoke at regular intervals.

* * * * *